(12) United States Patent
Canard

(10) Patent No.: US 6,327,882 B1
(45) Date of Patent: Dec. 11, 2001

(54) MOTOR VEHICLE THEFT-DETERRENT STEERING LOCK

(75) Inventor: Louis Canard, Nevers (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 09/661,909

(22) Filed: Sep. 14, 2000

(30) Foreign Application Priority Data

Sep. 17, 1999 (FR) .................................................. 99 11635

(51) Int. Cl.⁷ .................................................. B60R 25/02
(52) U.S. Cl. .................................................. 70/186; 70/252
(58) Field of Search .............................. 70/182–186, 252

(56) References Cited

U.S. PATENT DOCUMENTS

| | | | |
|---|---|---|---|
| 3,739,610 | * 6/1973 | Kuroki | 70/252 |
| 3,914,967 | * 10/1975 | Aronan | 70/252 |
| 3,959,996 | * 6/1976 | Thirion | 70/252 X |
| 4,309,882 | * 1/1982 | Maiocco | 70/186 |
| 4,400,954 | * 8/1983 | Nakamoto et al. | 70/186 |
| 4,414,830 | * 11/1983 | Maiocco | 70/186 X |
| 4,466,262 | * 8/1984 | Maiocco et al. | 70/186 X |
| 4,685,313 | * 8/1987 | Neyret | 70/186 |
| 5,271,252 | * 12/1993 | Yasuhara et al. | 70/186 |
| 6,237,378 | * 5/2001 | Canard | 70/252 |

FOREIGN PATENT DOCUMENTS

| | | |
|---|---|---|
| 1938921 | * 5/1971 | (DE) . |
| 0003994 | * 9/1979 | (EP) . |
| 0 210 962 A | 2/1987 | (EP) . |
| 1020336A1 | * 7/2000 | (EP) . |
| 2 601 990 A | 1/1988 | (FR) . |
| 2610882 | * 8/1988 | (FR) . |
| 2788477 | * 7/2000 | (FR) . |

* cited by examiner

*Primary Examiner*—Lloyd A. Gall
(74) *Attorney, Agent, or Firm*—Liniak, Berenato, Longacre & White

(57) ABSTRACT

The invention provides a theft deterrent (10) comprising a body (14, 16) in which there is mounted, so that it can slide, a lock bolt (50) associated with an immobilizing finger (110) housed in an immobilizing housing belonging to the deployment member (34) of a rotary lock (18), and associated with a puller (78), one tab (88) of which can be retained by a hook-shaped (106) retaining rocker (92) to release the steering column shaft to allow the vehicle to be used, wherein the immobilizing finger (110) belongs to an immobilizing member (64, 110) carried by the lock bolt (78) with respect to which it is mounted to pivot, about a transverse axis (B) perpendicular to the axial direction of the sliding of the lock bolt, against a return spring (84) which constantly urges it angularly in the direction corresponding to the housing of the immobilizing finger (110) in the immobilizing housing.

10 Claims, 7 Drawing Sheets

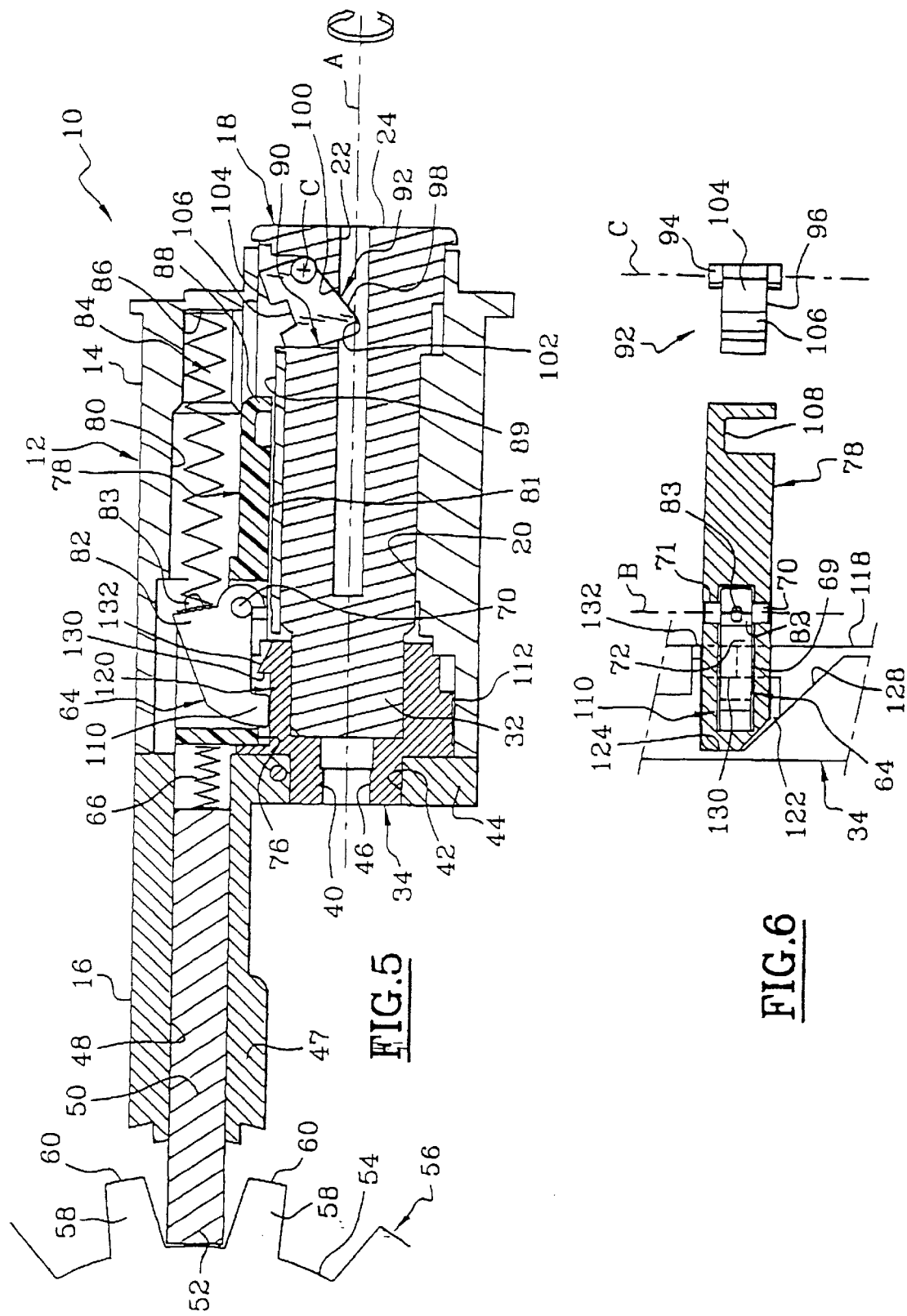

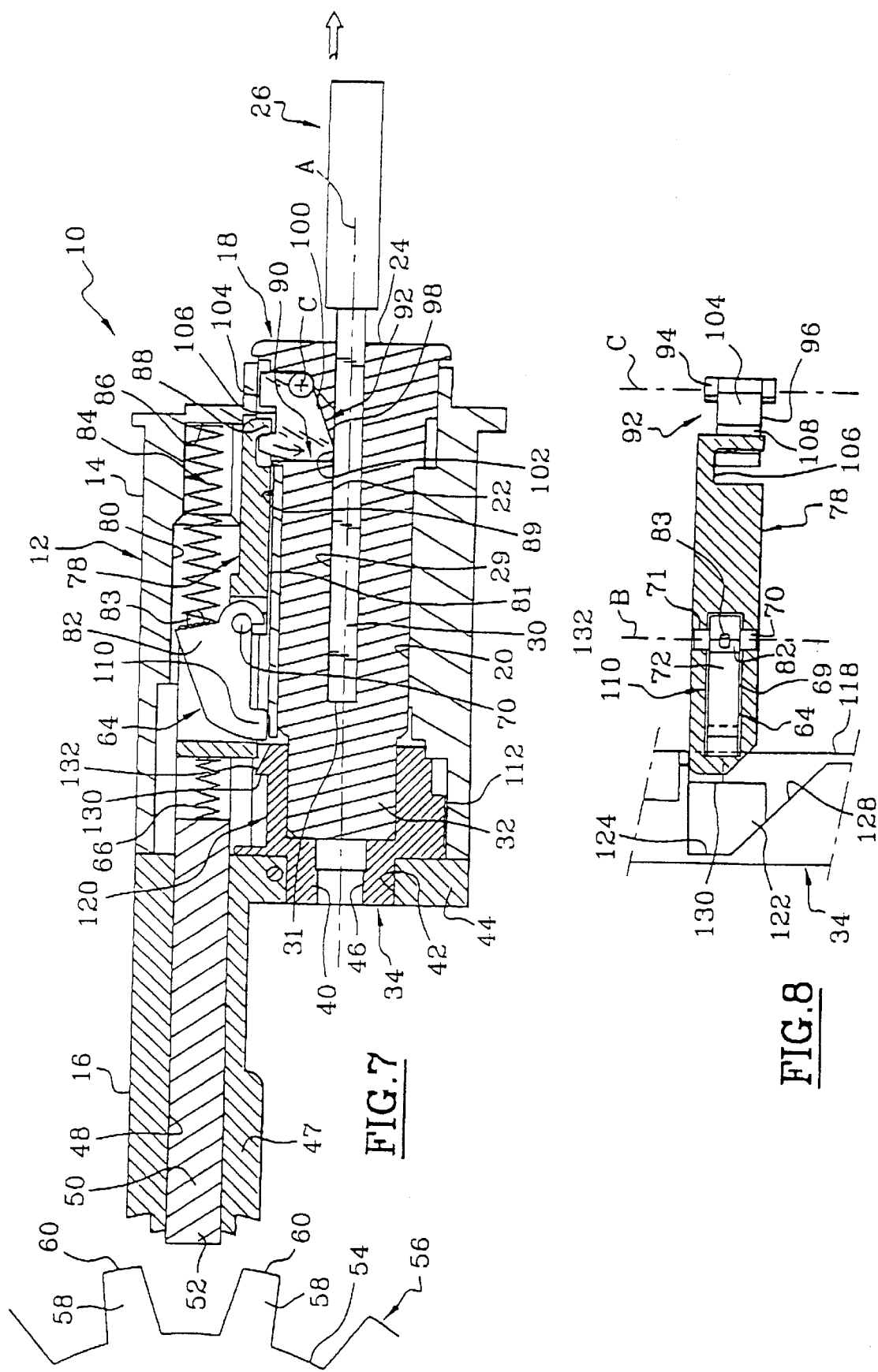

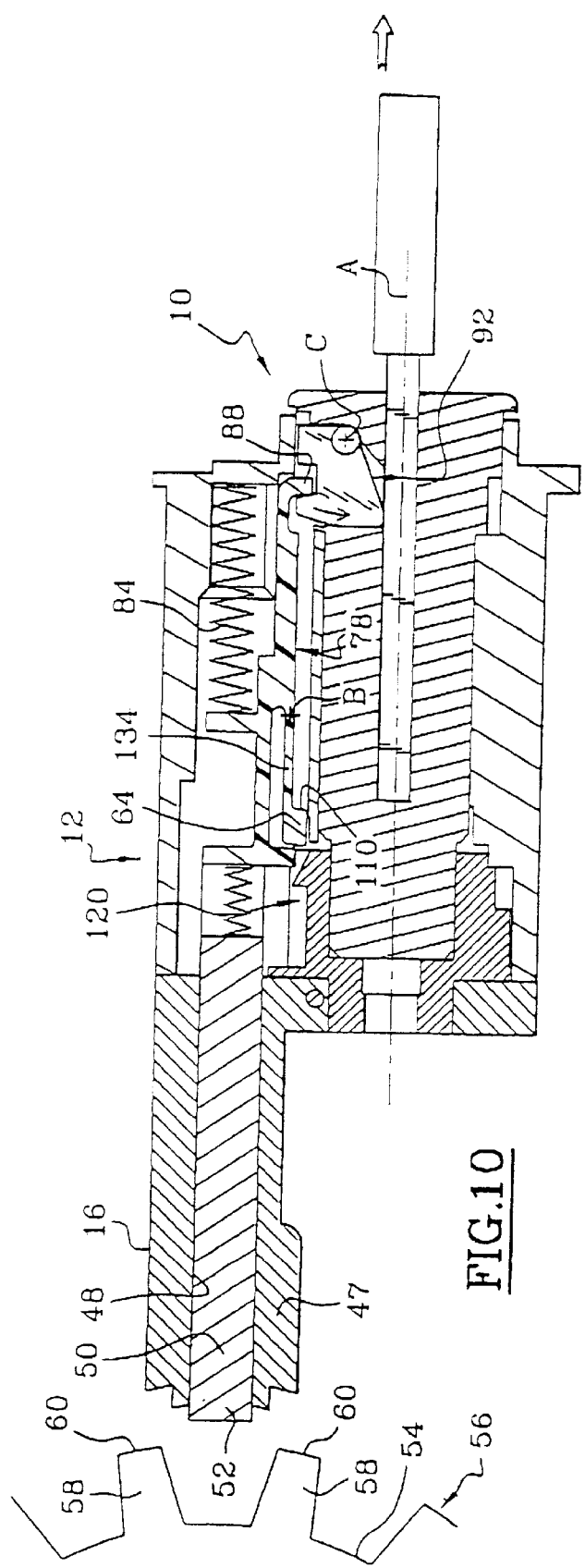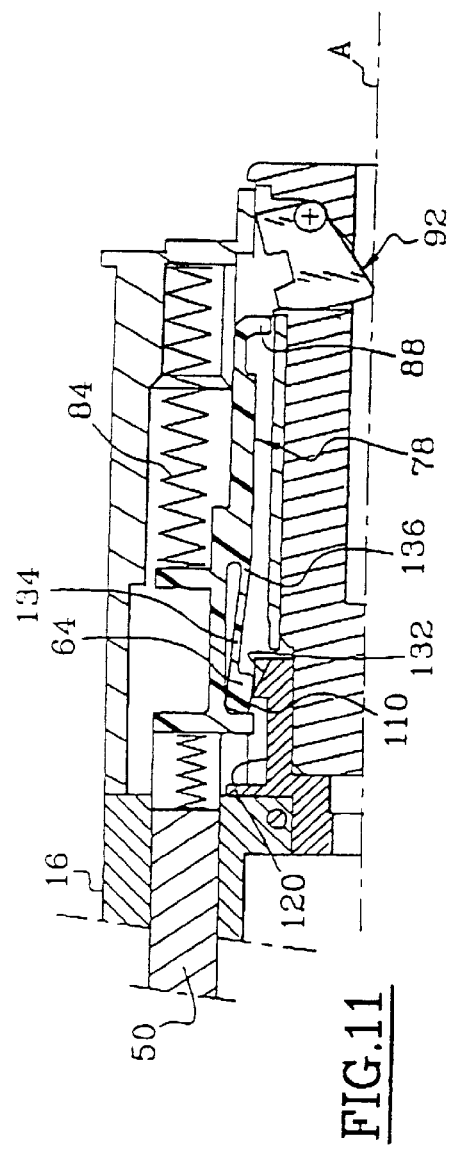
FIG.10
FIG.11

MOTOR VEHICLE THEFT-DETERRENT STEERING LOCK

BACKGROUND OF THE INVENTION

The present invention relates to a motor vehicle theft-deterrent steering lock.

The invention relates more specifically to a motor vehicle theft-deterrent steering lock of the type comprising a casing in which a lock is mounted to rotate between an angular position of rest in which a compliant key can be introduced, from the rear forward, or withdrawn, axially, and at least one angular position of use in which the key cannot be extracted from the lock, the lock comprising a rotary deployment member forming a cam which is capable of collaborating with a control member borne by a lock bolt to control the movements of the latter which is mounted so that it can slide in the casing, in an axial direction, between a forward theft-deterrent position toward which it is elastically urged and in which it projects axially forward through an opening in the casing to prevent the rotation of a member of the steering column when the lock is in the position of rest, with the key extracted, and a rear position in which it is retracted into the casing.

Numerous designs of theft deterrents such as this are known and are usually employed to prevent the theft of vehicles, particularly the theft of private automobiles.

Numerous improvements have been made to theft deterrents of this type, particularly as regards the lock, so as to improve the ability of the theft deterrent to withstand the various methods of attack devised by vehicle thieves.

It has, however, been found that there is still a possible form of break-in during which the thief tries to actually act on the lock bolt itself to drive this into the casing of the theft deterrent and release the steering column.

French patent application FR-A-2.788.477 of Jan. 15, 1999 already proposes a new design of a theft-deterrent steering lock of the kind mentioned previously which remedies this drawback by preventing any possibility of driving the lock bolt into the casing when the theft-deterrent device is in a position of rest, that is to say in a position in which it immobilizes the steering column in terms of rotation.

To this end, that document proposes a motor vehicle theft-deterrent steering lock of the type comprising a casing in which a lock is mounted to rotate between an angular position of rest in which a compliant key can be introduced, from the rear forward, or withdrawn, axially, and at least one angular position of use in which the key cannot be extracted from the lock, the lock comprising a rotary deployment member forming a cam which is capable of collaborating with a control member in the form of a control finger borne by a lock bolt to control the movements of the latter which is mounted so that it can slide in the casing, in an axial direction, between a forward theft-deterrent position toward which it is elastically urged and in which it projects axially forward through an opening in the casing to prevent the rotation of a member of the steering column when the lock is in the position of rest, with the key extracted, and a rear position in which it is retracted into the casing, and of the type in which:

- the lock bolt carries a retractable immobilizing finger which projects radially toward the axis to be housed in an immobilizing housing formed in a lateral face facing it belonging to the deployment member, of axial orientation, when the lock bolt is in the forward theft-deterrent position, to prevent or limit any movement of the lock bolt toward its retracted rear position;
- the immobilizing finger automatically moves out of the way as the lock is turned from its position of rest toward its position of use;
- and the lock bolt is held axially in the retracted rear position, in the presence of a key, by a lock bolt retaining member which is mounted so that it can move between a retracted position, when the key is absent, and a retaining position when there is a key present.

In that document, the immobilizing finger is mounted to slide radially in the lock bolt against the action of a return spring which constantly urges it radially inward toward the immobilizing housing, and the immobilizing finger also acts as a control finger.

This design is satisfactory from the functional point of view but presents certain drawbacks which the present invention intends to overcome.

In particular, the design of the control and immobilizing finger, in which the movements thereof are guided so that it slides radially in a cylindrical sleeve, with an axial compression spring which constantly urges it, presents risks of jamming, particularly since transverse loadings are applied at the unsupported functional free end of the immobilizing finger.

Furthermore, this design requires a special-purpose return spring for returning the immobilizing finger and another spring for constantly elastically urging the lock bolt toward its theft deterrent position. Aside from the high number of components which this design demands, these components are also complex and expensive to assemble and it is difficult to attach the hollow cylindrical body to the sheet metal puller.

Finally, the body of the finger in the form of a sleeve which acts as a finger for controlling the movements of the lock bolt acts on the latter indirectly via a "top of the spline" spring, which also constantly applies loading to an unsupported part of the cylindrical finger body whose guidance in the axial aperture formed in the lock bolt is, moreover, difficult to control.

In order to remedy these drawbacks, the invention proposes a theft deterrent of the aforementioned type, wherein the immobilizing finger belongs to an immobilizing member carried by the lock bolt with respect to which it is mounted to pivot, around a transverse axis perpendicular to the axial direction of the sliding of the lock bolt, against the action of a return spring which constantly urges it angularly in the direction corresponding to the housing of the immobilizing finger in the immobilizing housing.

According to other features of the invention:

- the rear axial end of the immobilizing member is mounted to pivot with respect to the lock bolt and the immobilizing finger is formed at the front axial end of the immobilizing member;
- the return spring is an axially acting spring which is inserted between the casing and the immobilizing member;
- the return spring is a compression spring which is inserted between the casing and a rear bearing face of the body of the immobilizing member, and the axial line of action of the spring is located radially on the outside with respect to the transverse axis of articulation of the immobilizing member;
- the immobilizing member is linked in axial translation with the lock bolt whose movement-control member it forms;
- the immobilizing member is made as a single piece with the lock bolt;

the immobilizing member is formed at the front free end of an elastic beam made as a single piece with the lock bolt and the rear end of which constitutes a hinge articulating the pivoting immobilizing member about its transverse axis;

the return spring for the immobilizing member acts as a lock bolt spring to constantly axially urge the latter toward its theft-deterrent position;

the part of the lock bolt which carries the immobilizing member is delimited radially toward the inside by an axial face in which there are formed means for the pivoting guidance of complementary means of articulation carried by the body of the immobilizing member;

the lock bolt comprises a rear part which is housed inside the casing and the front end of which carries the immobilizing member.

Other features and advantages of the invention will become apparent from reading the detailed description which will follow, for an understanding of which reference will be made to the appended drawings, in which:

DETAILED DESCRIPTION OF THE DRAWINGS

FIG. 5 is a view in axial section on a vertical plane passing through the horizontal axis of rotation of the lock and through the vertical axis of sliding of the immobilizing finger, in which the lock is depicted in its angular position of rest and in the absence of a key in theft deterrent device;

FIG. 6 is a schematic view from above of certain of the components of FIG. 5, and in which the deployment member forming a cam is illustrated as a development showing the relative position of the cam-forming deployment member, of the puller that controls the movements of the lock bolt and of the member that retains the latter;

FIGS. 7 and 8 are views similar to those of FIGS. 5 and 6, in which the lock is illustrated in its angular position of rest after return from its position of use;

FIG. 10 is a view similar to that of FIG. 7, which illustrates the second embodiment of the invention with the lock in position of rest; and FIG. 11 is a detail view similar to FIG. 10, in which the immobilizing finger with the puller are illustrated in an intermediate position in the course of the immobilizing of the steering column.

DETAILED DESCRIPTION OF THE INVENTION

Figure 1:
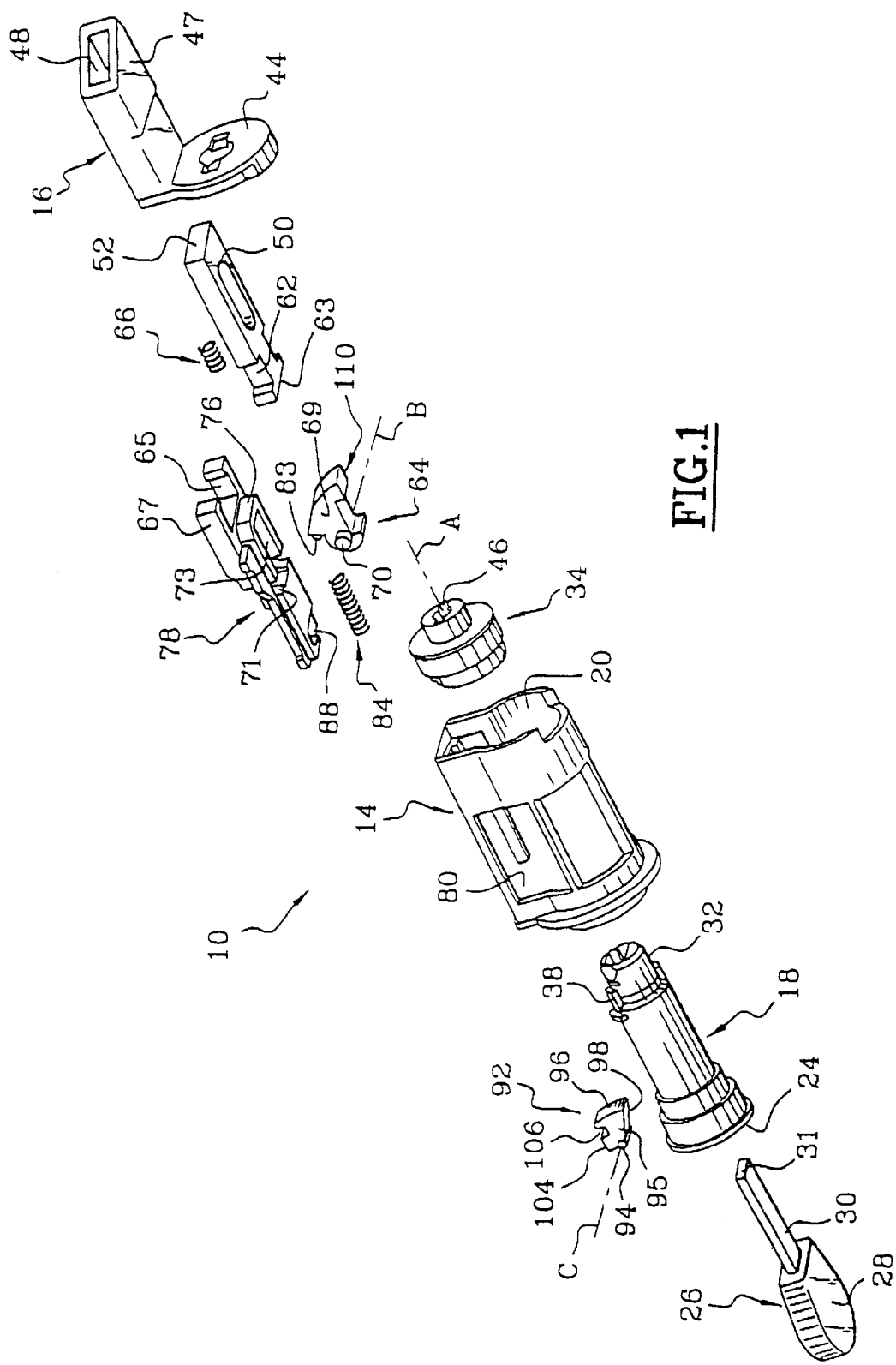
FIG. 1 is an exploded perspective view which illustrates the main constituent parts of a motor vehicle theft-deterrent steering lock produced in accordance with the teachings of the invention, the view depicting the casing of the theft-deterrent from the rear.
Figure 2:
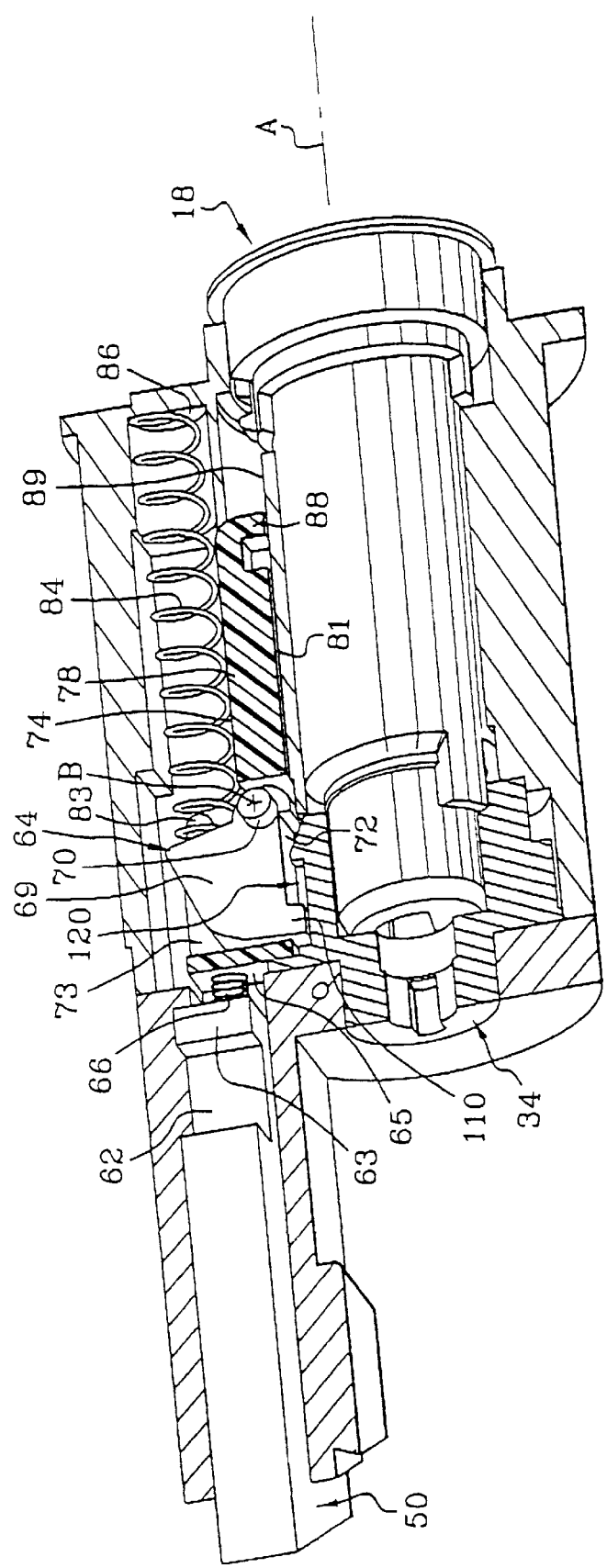
FIG. 2 is a detail view on a larger scale which illustrates, in three-quarters rear perspective, the main moving parts of the theft deterrent of FIG. 1 which are depicted in assembled position and in which the lock is illustrated in its angular position of use with the lock bolt in the retracted rear position in which it is retained by the deployment member that forms the lock cam.
Figure 3:
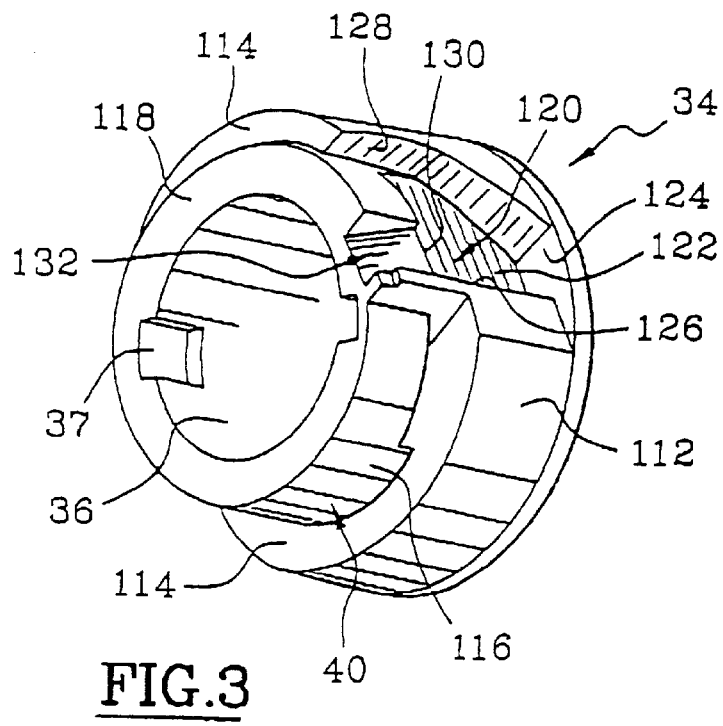
FIG. 3 is a view on a large scale and in three-quarters rear perspective, of the deployment member that forms the cam.

In the description which will follow, in order to make for better understanding thereof and of the claims, non-limiting use will be made of the terms "horizontal", "vertical", "upper", "lower", "front", "rear", etc.

The figures depict a motor vehicle theft-deterrent device 10 which comprises a casing 12 made in two molded parts: a rear part 14 and a front part 16. The lower portion, when considering the figures, of the rear part 14 of the theft-deterrent casing delimits a cylindrical housing 20 in which there is mounted, so that it can rotate, about the longitudinal axis A, a rotary lock 18 which in this instance is illustrated diagrammatically in the form of a barrel mounted axially from the rear forward, that is to say from right to left when considering FIG. 5, in the rear part 14 of the casing 12.

The rotary lock 18, of known overall design, comprises an axial passage 22 which opens into its rear transverse face 24 for the axial introduction and extraction of a key 26 for turning the lock 18 which for this purpose has a key head 28 and a key body or shank 30 designed to be housed in the passage 22, the shank 30 and the passage 22 here, by way of example, being complementary of one another and of rectangular cross section.

The smaller-diameter front free end portion 32 of the lock 18 rotates, in both directions, a deployment member 34 of annular cylindrical overall shape which has a rear internal bore 36 of large diameter, in which the front end 32 of the lock 18 is housed, the two elements causing each other to rotate via a stud 38 of the part 32 housed in a complementary notch 37 in the bore 36.

The smaller-diameter front annular cylindrical part 40 of the deployment member 34 is guided in rotation in a hole 42 formed in the transverse plate-shaped part 44 of the front part 16 of the casing 12.

The front end portion 40 of the deployment member 34 is shaped internally with a shape 46 which is not of revolution, particularly so as to turn an electric commutator/switch assembly associated with the theft deterrent device 10, which assembly is not depicted in the figures.

The upper part, in the shape of a longitudinal sleeve 47, of the front part 16 of the casing 12 which extends longitudinally forward, from the plate 44, delimits an internal channel 48 for guiding, in longitudinal sliding parallel to the axis A, the body 50 of a locking bolt which in this instance is of rectangular cross section, and the front free end 52 of which is designed to be accommodated in an axially oriented groove or spline 54 on a steering column shaft 56, the axis of rotation of which is, on the whole, perpendicular to the direction in which the lock bolt 50 slides and to the axis A of the lock.

The grooves 54 are delimited by raised adjacent splines 58 delimited radially by spline tops 60.

In its front longitudinal part, the lock bolt 50 comprises, in its lateral faces, two slots or grooves 62 which give it the overall shape of a "T", the rear transverse bar 63 of which slides axially into a complementary housing 65 formed at the front free end of a control puller 78 associated with the lock bolt 50, with an intermediate helical compression spring 66 which constantly elastically urges the lock bolt 50 forward with respect to the puller 78.

The open-end design of the grooves 62 and the hooked-arms design 67 of the front end of the puller 78, these hooks delimiting the housing 65 between them, makes these two components easy to assemble in the radial direction, with the interposition of the spring 66.

A detailed description will now be given of the design of the puller 78 and of the pivoting member 64 it carries which, within the meaning of the invention, acts as a member for controlling the movements of the puller 78, and therefore of the lock bolt 50, in both directions, and acts as an immobilizing member, comprising an immobilizing finger, as will be explained hereinafter.

The control member 64 is a molded component, the body 72 of which is articulated, at its rear axial end, to the puller 78 about a transverse axis of articulation B which is orthogonal to the axis A and which is located roughly in the axial mid-plane of the puller 78.

The articulation is embodied by two transversely opposed stubs 70, which extend from the parallel and opposed vertical lateral faces 69 of the body 72 of the pivoting control member 64, the maximum transverse width of which they define.

At its front free axial end, the body 72 has an immobilizing finger 110 which extends radially inward toward the axis A, that is to say in a direction roughly perpendicular to the overall axial direction of the body 72.

Near its rear axial end, the body 72 has an upper transverse bearing tab 82 for a helical compression spring 84, the rear end of which bears against a corresponding surface 86 of the rear part 14 of the casing 12 so as to constantly and elastically urge the control and immobilizing member 64 to pivot about its axis B in the counterclockwise direction when considering FIG. 5.

More specifically, the front axial end of the lock bolt spring 84, which also acts as a return spring for the pivoting member 64, is centered on a peg 83 which projects axially toward the rear from the tab 82.

The layout and dimensions of the components are such that the straight line "D" taking the axial force exerted by the spring 84 on the tab 82 lies above the axis B, that is to say that it is radially offset outward with respect to the latter, and the spring 84 extends axially above the upper face 74 of the puller 78.

The puller 78 is a molded part, for example made of plastic material, and its rear part, as opposed to its front part which comprises the arms 67, is delimited by a lower face 81 into which there opens vertically downward a recess 73 of dimensions such that it accommodates, with transverse clearance, the body 72 of the pivoting control and immobilizing member 64.

Near the axial rear end of the housing 73, the lower face 81 has two semi-cylindrical housings 71, which are open radially toward the axis A, and each of which houses, with rotation, a complementary stub 70 for the pivoting mounting of the control and immobilizing member 64.

The housing 73 is of course dimensioned axially in such a way that the immobilizing finger 110 projects radially inward toward the axis A.

By virtue of its design, the control member 64 is not only mounted so that it can pivot with respect to the puller 78, but is also connected to the latter in terms of one-way axial translation, and therefore to the lock bolt 50 whose movements in both directions it can control via the spring 66.

The puller 78 is thus, on the whole, in the form of an axially oriented horizontal plate which extends into a housing 80 formed in the upper part of the rear part 14 of the casing 12 above the lock 18, this housing 80 communicating with the bore 20 for guiding the rotation of the barrel 18.

The rear axial end 88 of the puller 78 is of smaller transverse width and comprises, oriented radially inward in the direction of the axis A, a tab 88 for retaining the puller 78 and the lock bolt 50.

The tab 88 extends opposite the outer cylindrical surface 89 of the lock body 18 in which there is formed, near the transverse rear face 24, a housing 90 of generally right-angled parallelepipedal shape, which opens radially outward and radially inward into the key passage 22.

The housing 90 accommodates a member 92 in the form of a rocker for retaining the puller 78 in the retracted rear position, in certain configurations.

For this purpose, the rocker 92 is mounted so that it can pivot around a transverse axis C perpendicular to the axis A, the body of the rocker 92 for this purpose comprising two articulation stubs 94 which extend transversally from its axially oriented lateral faces 95 and 96 and which are articulated in complementary parts of the housing 90.

To define the retracted position of the rocker 92, which position is illustrated in particular in FIG. 5, the inclined lower face 98 of the rocker bears against an inclined bottom 100 of the housing 90 with the front lower end part 102 of the rocker body 92 extending into the key passage 22 (see FIG. 5).

To cooperate with the retaining tab 88 of the puller 78, the upper face 104 of the rocker 92 is shaped as a hook and for this purpose comprises a notch 106 which opens, on the whole, radially outward, which is open in the lateral face 96 of the rocker 92 visible in the plane of FIG. 5.

In its retracted position illustrated in particular in FIG. 5, the front part of the upper face 104 of the rocker 92 is retracted into the housing 90, that is to say that the rear tab 88 of the puller 78 can move axially from front to rear to come axially into line with the transverse plane in which the notch 106 is formed, so as to be housed therein following a rocking of the retaining member 92 about its axis C, in the clockwise direction when considering FIG. 5, as will be explained hereinafter.

In its position illustrated in FIG. 5, it can be seen that the lower face 98 of the rocker 92 bearing against the bottom 100 of the housing 90 is inclined by about 45° so as to constitute a ramp forming a cam to control the pivoting of the rocker 92 when the shank 30 of the key 26 is introduced axially into the passage 22, under the action of its front free end transverse face 31 which collaborates with the lower face 98.

When the key 26, 30 is present in the passage 22, the rocker 92 is kept in its deployed retaining position illustrated in FIGS. 5 and 7, in which it is capable of collaborating with the retaining tab 88 of the puller 78, because the front free end of its lower face 98 bears against a lateral face 29 of the shank 30 of the key 26.

The cam-forming deployment member 34 and its collaboration with the associated immobilizing finger 110 belonging to the pivoting control and immobilizing member 64 will now be described in detail.

The larger-diameter rear main part of the deployment member 34 is delimited by a cylindrical surface forming a peripheral skirt 112 which is delimited axially toward the rear by an annular radial shoulder 114 and which is extended axially toward the rear by the outer cylindrical surface 116 of the smaller-diameter rear part 40 which is delimited by a transverse annular rear end transverse face 118.

Formed in the cylindrical wall 112 is an immobilizing housing 120 which is delimited radially toward the inside by a tangentially oriented flat bottom 122, axially toward the front by a transverse face 124, laterally, on the one side, by an axially oriented vertical facet 126 and, on the other side, by a two-face vertical facet forming a cam or ramp 128 which extends from the front transverse face 124 as far as the rear annular transverse face 114.

The immobilizing housing 120 is also delimited axially toward the rear by a vertical transverse abutment surface 130.

To allow the immobilizing finger 110 to enter the immobilizing housing 120 axially from the rear forward, there is an inlet ramp 132 which is inclined upward from the rear forward, extending axially from the rear annular transverse face 118 as far as the transverse abutment surface 130.

The way in which the theft deterrent device 10 works will now be described, starting from the position illustrated in FIGS. 5 and 6. French patent application FR-A-2,788,477 of Jan. 15, 1999, to the content of which reference may be made, contains a fuller description of the operation.

In this position of rest, the lock bolt 50 is in its forward theft deterrent position in which its free end 52 is housed in a groove 54 and it is constantly urged into this position by the spring 66.

In this position of rest illustrated in FIGS. 5 and 6, the return spring axially urges the puller 78 forward with its front transverse end edge 76 bearing against the rear transverse end 124 of the immobilizing housing 120.

In the event of an attempted break-in aiming at driving the lock bolt axially from the front rearward, that is to say from the left to the right when considering FIGS. 5 and 6, the lock bolt 50, via the coil-bound compressed spring 66, carries along with it the control member 64 and therefore the immobilizing finger 110.

The attempt at moving the lock bolt 50 therefore leads to the immobilizing finger 110 being brought into abutment against the transverse abutment surface 130 of the immobilizing housing 120, which prevents the lock bolt 50 from retracting sufficiently into the casing 12 of the theft deterrent device, that is to say prevents the steering column shaft 56 from being freed to rotate.

When the user introduces a compliant key 26 into the key passage 22, he causes the retaining rocker 92 to pivot in the clockwise direction about its axis C.

Given that at that time the puller 78 is in a forward position corresponding to the forward theft-deterrent position of the lock bolt 50, the rear retaining tab 88 of the puller 78 is not opposite the rocker 92 and the latter can pivot without the tab 88 being received in the hook-forming notch 106 of the retaining rocker 92.

The use of the theft deterrent with a view to allowing the vehicle to be started and used, then consists in turning the key in the direction shown by the arrow in FIG. 5 to end up in the position of use in which the lock 18 has been turned through an angular travel from its position of rest.

Turning the key 26 and the barrel 18 causes a corresponding rotation in the same direction of the deployment member 34.

Figure 4:
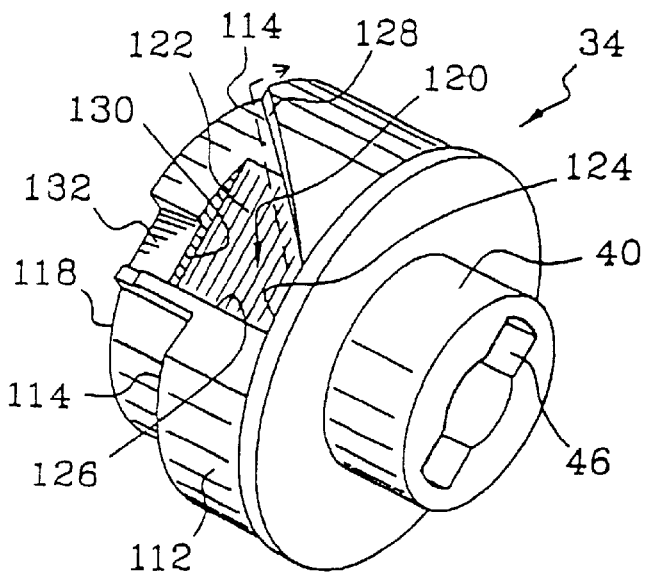
FIG. 4 is a view similar to that of FIG. 3, in which the deployment member is illustrated in three-quarters front respective.

During this rotation, the immobilizing finger 110 collaborates via its cylindrical lateral face with the ramp 128 so as to deploy it from the immobilizing housing 120, along the path shown in FIG. 4, to lie facing the transverse abutment surface 114.

This deployment of the immobilizing finger 110 also causes a backward axial movement of the pivoting control member 64 and therefore of the lock bolt 50 which leaves the grooves 54, thus freeing the steering column shaft 56.

The puller 78 has also been moved angularly with respect to the retaining rocker 92 carried by the barrel of the lock 18, the rocker 92 remaining in its active position in which it projects radially outward while the rear retaining tab 88 of the puller 78 has moved axially backward, that is to say now lies in line with the notch 106 of the retaining rocker 92, which notch it will then be able to enter in the tangential direction.

Specifically, starting out from the position of use and after the vehicle engine has been started, the user releases his action on the key 26 and elastic return means (not depicted) for returning the lock 18 tend to return it to its position of rest illustrated in FIGS. 7 and 8.

As the lock 18 returns to the position of rest, the retaining tab 88 enters the notch 106 until it comes to bear tangentially against the bottom 108 of the notch of the puller, the retaining rocker 92 remaining in its up-position in which it projects radially to thus axially retain the puller 78, and therefore the lock bolt 50, via the pivoting control member 64, in the rear position of rest, the steering column shaft 56 remaining free to rotate.

As can be seen in FIG. 7, the immobilizing finger 110 extends opposite the ramp 130 but it plays no direct part in retaining the lock bolt 50, this retention being provided by the rocker 92 and the puller 78.

Starting out from the position illustrated in FIG. 7, when the user axially withdraws the key from the front backward, the shank 30 leaves the key passage 22, and the retaining rocker 92 drops down into the key passage 22, that is to say pivots in a counter-clockwise direction about its axis of rocking C.

The pivoting action results in the release of the retaining tab 88, which is no longer retained by the hook 106 and the puller 78 is then immediately urged elastically forward, that is to say from right to left, by the spring 84 to once again occupy its position illustrated in FIG. 5. During this return movement of the lock bolt 50 with the puller 78 to its forward position in which the steering column shaft 56 is locked, the immobilizing finger 110 rises up the ramp 130 to again enter the immobilizing housing 120, coming to bear radially against the bottom 122 of the latter under the action of the immobilizing spring 84.

If the lock bolt 50 is not facing a groove 54 but, on the other hand, is facing the top 60 of a spline 58, its forward axial travel is limited and it remains in an intermediate position by virtue of the presence of the spring 66.

The puller 78, with the pivoting control and immobilizing member 74 which includes the immobilizing finger 110, are in an intermediate axial position because the pivoting control and immobilizing member 64 is bearing against the coil-bound spring 66.

To release the steering column shaft 56, the driver turns the latter until the lock bolt 50 is facing a groove 54.

As soon as the steering column shaft 56 has reached this angular position, the lock bolt 50 with the puller 78 moves globally axially forward to once again occupy the position illustrated in FIGS. 5 and 6.

The second embodiment illustrated in FIGS. 9 to 11, in which elements which are identical or similar to those described and depicted previously are denoted by the same reference numerals, will now be described.

As can be seen from these figures, the immobilizing member 64, in the form of a pivoting immobilizing finger 64, 110, is made as a single piece by moulding of plastics material with the body of the puller 78.

More specifically the immobilizing finger 64, 110 is formed at the front free end of a beam 134, the rear end 136 of which is connected to the body of the puller to constitute an articulation zone allowing pivoting of the immobilizing member in both directions about a transverse axis B located more or less in line with the zone 136.

By virtue of this design, it is the elastic beam 134 which acts as a return spring for returning the pivoting immobilizing member 64, 110.

Figure 9:
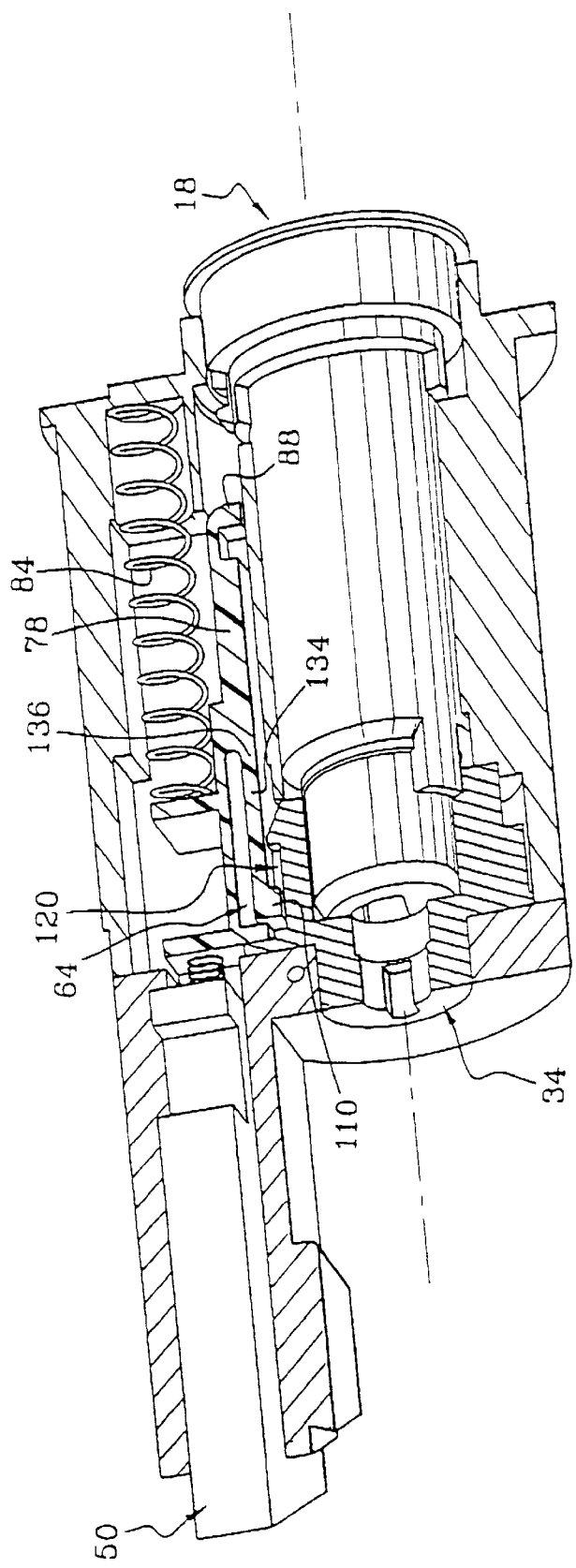
FIG. 9 is a view similar to that of FIG. 2, which depicts a second embodiment of the invention, in which embodiment the immobilizing member with its return spring are made as a single piece with the lock bolt puller.

Of course, and as can be seen in FIGS. 9 to 11, it is then necessary to again provide a puller spring 84 acting between the casing and the puller as in French patent application FR-A-2,788,477.

This second embodiment is far simpler to produce and to assemble, whereas its operation is, in every respect, identical to that of the first embodiment already described.

What is claimed is:

1. A motor vehicle theft-deterrent steering lock (10) of the type comprising a casing (12, 14, 16) in which a lock (18) is mounted to rotate between an angular position of rest in which a compliant key (26, 30) can be introduced, from the rear forward, or withdrawn, axially, and at least one angular position of use in which the key (26, 30) cannot be extracted from the lock (18), the lock comprising a rotary deployment member (34) forming a cam which is capable of collaborating with a control member (110, 64) borne by a lock bolt (50, 78) to control the movements of the latter which is mounted so that it can slide in the casing (12), in an axial direction, between a forward theft-deterrent position toward which it is elastically urged and in which it projects axially forward through an opening in the casing to prevent the rotation of a member (56) of the steering column when the lock (18) is in the position of rest, with the key extracted, and a rear position in which it is retracted into the casing, and of the type in which:

the lock bolt (50, 78) carries a retractable immobilizing finger (110) which projects radially toward an axis (A) to be housed in an immobilizing housing (120) formed in a lateral face (112) facing it belonging to the deployment member (34), of axial orientation, when the lock bolt (50, 78) is in the forward theft-deterrent position, to prevent or limit any movement of the lock bolt toward its retracted rear position;

the immobilizing finger (110) automatically moves out of the way as the lock (18) is turned from its position of rest toward its position of use;

and the lock bolt (50, 78) is held axially in the retracted rear position, in the presence of a key, by a lock bolt retaining member (92) which is mounted so that it can move between a retracted position, when the key is absent, and a retaining position when there is a key present, wherein the immobilizing finger (110) belongs to an immobilizing member (64, 110) carried by the lock bolt (78) with respect to which it is mounted to pivot, around a transverse axis (B) perpendicular to the axial direction of the sliding of the lock bolt, against the action of a return spring (84, 134) which constantly urges it angularly in the direction corresponding to the housing of the immobilizing finger (110) in the immobilizing housing (120).

2. The theft deterrent as claimed in claim 1, wherein the rear axial end (70) of the immobilizing member (64, 110) is mounted to pivot with respect to the lock bolt (78) and the immobilizing finger (110) is formed at the front axial end of the immobilizing member (64).

3. The theft deterrent as claimed in claim 2, wherein the return spring (84) is an axially acting spring which is inserted between the casing and the immobilizing member (64, 110).

4. The theft deterrent as claimed in claim 3, wherein the return spring (84) is a compression spring which is inserted between the casing and a rear bearing face of the body (72) of the immobilizing member (64, 110), and the axial line of action of the spring is located radially on the outside with respect to the transverse axis (B) of articulation of the immobilizing member (64, 110).

5. The theft deterrent as claimed in claim 1, wherein the immobilizing member (64, 110) is made as a single piece with the lock bolt (50, 78).

6. The theft deterrent as claimed in claim 5, wherein the immobilizing member (64, 110) is formed at the front free end of an elastic beam (134) made as a single piece with the lock bolt (78) and the rear end (136) of which constitutes a hinge articulating the pivoting immobilizing member (64, 110) about its transverse axis (B).

7. The theft deterrent as claimed in claim 4, wherein the immobilizing member (64, 110) is linked in axial translation with the lock bolt (50, 78) whose movement-control member it forms.

8. The theft deterrent as claimed in claim 7, wherein the return spring (66) for the immobilizing member (64, 110) acts as a lock bolt spring to constantly axially urge the latter (50, 78) toward its theft-deterrent position.

9. The theft deterrent as claimed in claim 8, wherein the part of the lock bolt (78) which carries the immobilizing member (64, 110) is delimited radially toward the inside by an axial face (81) in which there are formed means (71) for the pivoting guidance of complementary means of articulation (70) carried by the body of the immobilizing member (64, 110).

10. The theft deterrent as claimed in claim 1, wherein the lock bolt (50, 78) comprises a rear part (78) which is housed inside the casing (80) and the front end (76) of which carries the immobilizing member (64, 110).

* * * * *